United States Patent
Hyodo et al.

(10) Patent No.: US 8,779,714 B2
(45) Date of Patent: Jul. 15, 2014

(54) MOVABLE UNIT DRIVING APPARATUS

(75) Inventors: Yoshimasa Hyodo, Tokyo (JP); Ken-ichi Ichimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 919 days.

(21) Appl. No.: 12/856,445

(22) Filed: Aug. 13, 2010

(65) Prior Publication Data
US 2011/0043151 A1 Feb. 24, 2011

(30) Foreign Application Priority Data

Aug. 18, 2009 (JP) ................................. 2009-189519

(51) Int. Cl.
*H02P 3/00* (2006.01)
(52) U.S. Cl.
USPC ............ 318/466; 318/266; 318/467; 318/484
(58) Field of Classification Search
USPC ................ 318/266, 461, 466, 467, 468, 484; 396/87, 164, 187, 188, 264, 286, 289
See application file for complete search history.

(56) References Cited

U.S. PATENT DOCUMENTS

| | | | | |
|---|---|---|---|---|
| 4,472,042 A | * | 9/1984 | Iwata et al. | 396/165 |
| 4,515,453 A | * | 5/1985 | Wakabayashi et al. | 396/62 |
| 4,734,733 A | * | 3/1988 | Clapp et al. | 396/164 |
| 5,122,828 A | * | 6/1992 | Kobayashi et al. | 396/165 |
| 5,134,433 A | * | 7/1992 | Takami et al. | 396/165 |
| 5,463,437 A | * | 10/1995 | Takami | 396/177 |
| 5,471,370 A | * | 11/1995 | Takami | 362/4 |
| 6,618,559 B1 | * | 9/2003 | Hofer | 396/87 |

FOREIGN PATENT DOCUMENTS

| | | |
|---|---|---|
| JP | 58-002827 A | 1/1983 |
| JP | 04-212941 A | 8/1992 |
| JP | 2001-051337 A | 2/2001 |

* cited by examiner

*Primary Examiner* — Bentsu Ro
*Assistant Examiner* — Thai Dinh
(74) *Attorney, Agent, or Firm* — Canon USA Inc. IP Division

(57) ABSTRACT

A movable unit driving apparatus which drives a movable unit by a motor, the movable unit driving apparatus includes a first detection unit configured to detect that the movable unit passes a first position; a second detection unit configured to detect that the movable unit passes a second position after the first detection unit detects that the movable unit has passed the first position; a first measurement unit configured to measure time from when the first detection unit detects that the movable unit passes the first position to when the second detection unit detects that the movable unit passes the second position; and a setting unit configured to set time from when the movable unit is detected to have passed the second position to when a brake is applied to the motor based on the time measured by the first measurement unit.

4 Claims, 10 Drawing Sheets

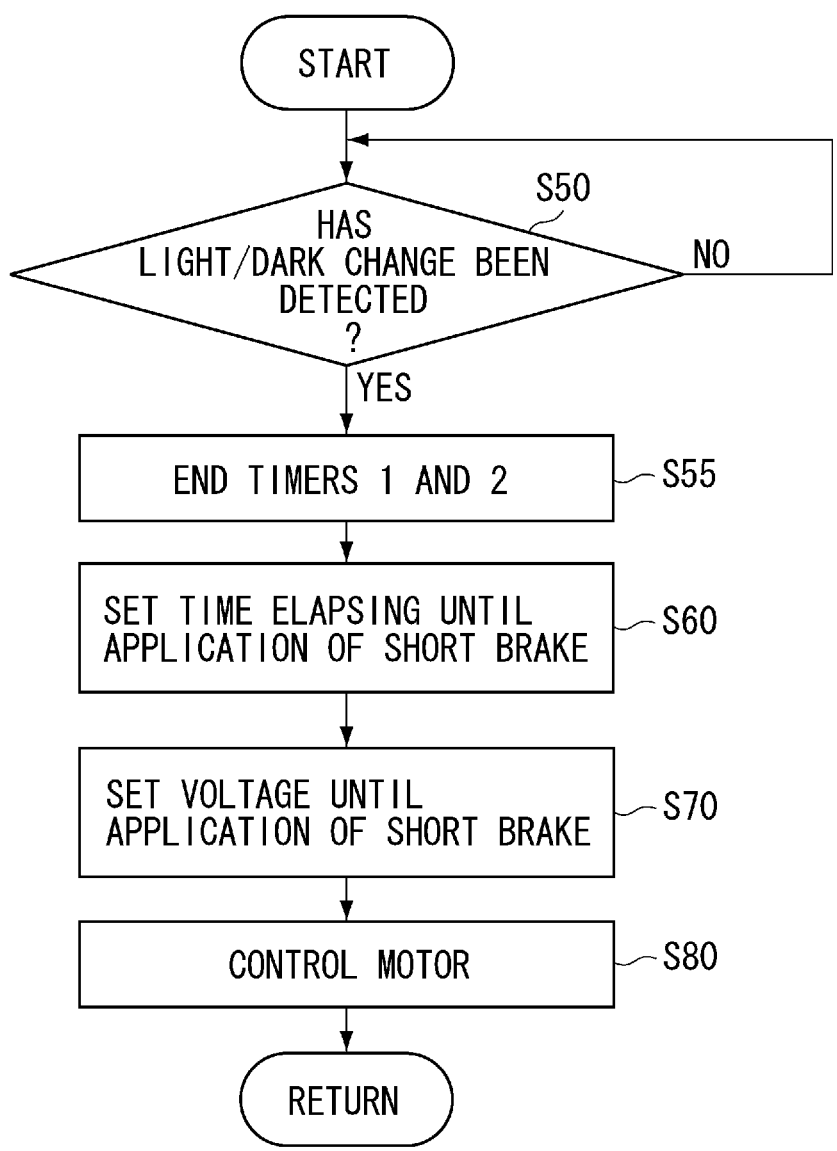

MOVABLE UNIT DRIVING APPARATUS

BACKGROUND OF THE INVENTION

1. Field of the Invention

The present invention relates to a driving apparatus for driving a movable unit.

2. Description of the Related Art

Conventionally, a driving apparatus for driving a movable unit performs control to stop the movable unit by detecting a position where the movable unit is moving by a position detection switch or the like.

U.S. Pat. No. 4,472,042 discusses a flash camera as a movable unit driving apparatus equipped with a flash light emitting unit as a movable unit. The camera is equipped with a motor for movably driving the flash light emitting unit and a switch for detecting a position of the moving flash light emitting unit. The motor moves the flash light emitting unit to a light emitting position according to luminance of a field. The switch detects timing with which the flash light emitting unit is driven and stopped.

However, in the above camera as discussed in U.S. Pat. No. 4,472,042, a driving voltage of the motor is always controlled to a fixed level, and driving and stopping of the motor is controlled according to whether there is a signal from the switch or not. In such a camera, when a load at the time of motor driving is changed due to a change in a camera environment such as temperature and humidity, a driving speed of the flash light emitting unit becomes rather unstable. For example, when an ambient temperature is low, a lead wire connected to the flash light emitting unit is rather hard, as a result, the driving speed of the flash light emitting unit may be reduced.

SUMMARY OF THE INVENTION

According to an aspect of the present invention, a movable unit driving apparatus which drives a movable unit by a motor includes a first detection unit configured to detect that the movable unit passes a first position, a second detection unit configured to detect that the movable unit passes a second position after the first detection unit detects that the movable unit has passed the first position, a first measurement unit configured to measure time from when the first detection unit detects that the movable unit passes the first position to when the second detection unit detects that the movable unit passes the second position, and a setting unit configured to set time from when the movable unit is detected to have passed the second position to when a brake is applied to the motor based on the time measured by the first measurement unit.

According to the present invention, it is possible to drive a movable unit in a stable manner independently of a change in a driving load.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 8A and 8B are flowcharts illustrating an operation of the flashlight emitting device of the exemplary embodiment.

DESCRIPTION OF THE EMBODIMENTS

Various exemplary embodiments, features, and aspects of the invention will be described in detail below with reference to the drawings.

Figure 1:
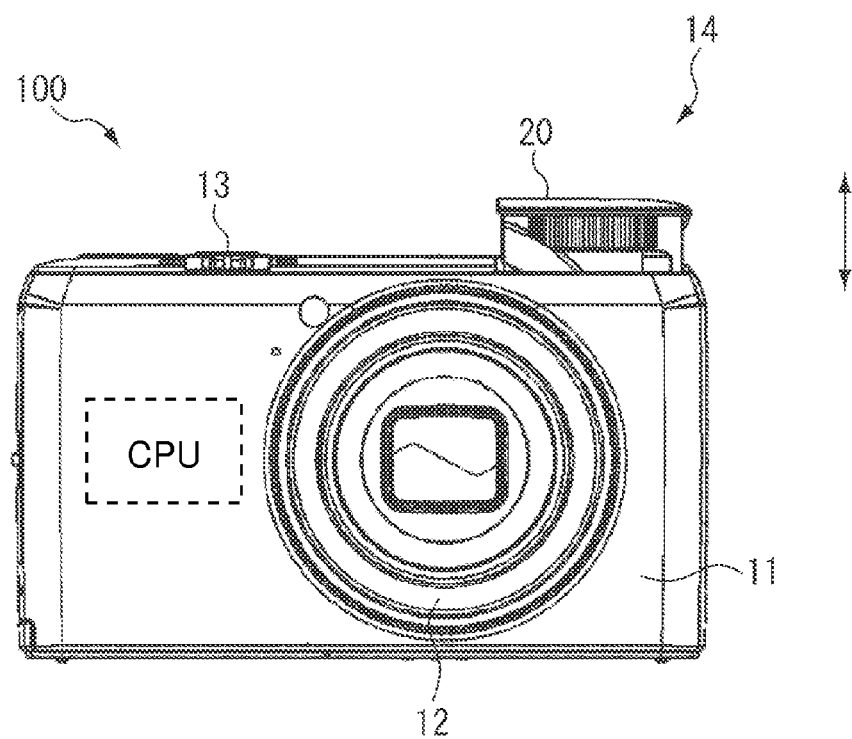
FIG. 1 is an external front view of an image pickup apparatus according to an exemplary embodiment of the present invention.

First, an image pickup apparatus equipped with a flashlight emitting device according to an exemplary embodiment of the present invention will be described below with reference to FIG. 1. In the present exemplary embodiment, the image pickup apparatus includes, for example, of a digital still camera (hereinafter referred to as the camera). FIG. 1 is an external front view of the camera.

As illustrated in FIG. 1, a camera 100 includes an exterior member 11, a lens barrel portion 12, a release button 13, a flashlight emitting device 14, and the like. Accommodated in the exterior member 11 are image pickup elements such as charge-coupled devices (CCDs) or complementary metal oxide semiconductors (CMOSs) (not illustrated). A user performs shooting by pressing the release button 13. An optical image transmitted through lenses (not illustrated) provided in the lens barrel portion 12 is captured by the image pickup elements, undergoes predetermined image pickup processing, and is recorded as image data. When shooting is performed at night or in a dark place, a light emitting unit 20 of the flashlight emitting device 14 emits flashlight automatically or in response to an operation by the user to aid the shooting.

The camera 100 of the present exemplary embodiment is formed so as to be capable of accommodating the light emitting unit 20 in the exterior member 11 which constitutes a camera main body or exposing the light emitting unit 20 out of the exterior member 11 as needed. More specifically, the light emitting unit 20 is movable in a direction indicated by an arrow in FIG. 1, that is, a vertical direction. Here, the light emitting unit 20 of the flashlight emitting device 14 illustrated in FIG. 1 is exposed outside the exterior member 11 (i.e., at a light emitting position). On the other hand, when the light emitting unit 20 of the flashlight emitting device 14 is accommodated, an upper surface of the light emitting unit 20 is leveled with an upper surface of the camera 100 (i.e., at an accommodated position).

Figure 2:
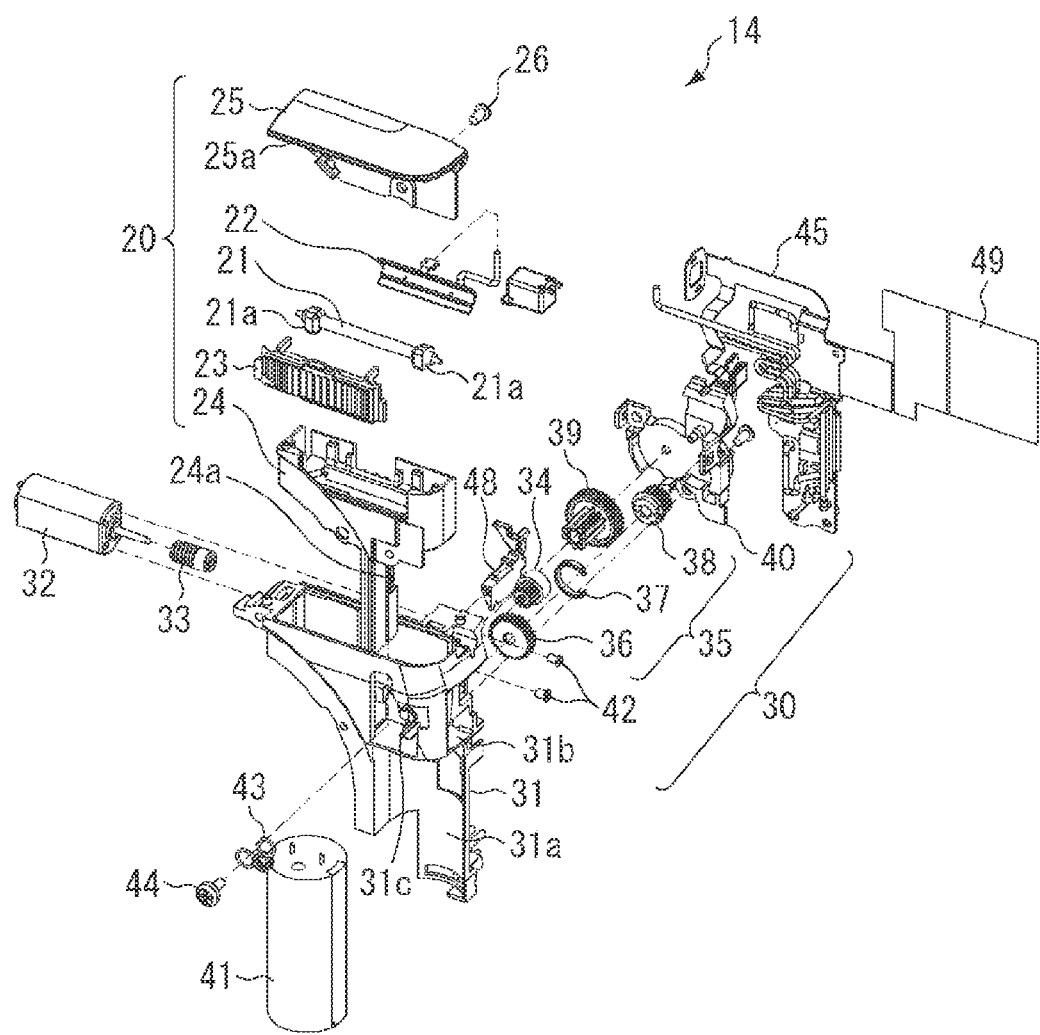
FIG. 2 is an exploded perspective view of a flashlight emitting device according to the exemplary embodiment.

Next, construction of the flashlight emitting device 14 will be described with reference to FIG. 2. FIG. 2 is an exploded perspective view of the flashlight emitting device 14. The flashlight emitting device 14 includes a plurality of components which are assembled into a single unit.

First, the light emitting unit 20 of the flashlight emitting device 14 will be described. The light emitting unit 20 includes a xenon tube 21, a light reflector 22, a prism panel 23, a base member 24, a cover member 25, and the like.

The xenon tube 21 constitutes a light emission source, and is electrically connected to an anode and a cathode by lead wires described below. The xenon tube 21 is connected to a flexible wiring board 45 illustrated in FIG. 2 which is a circuit board arranged inside the camera main body. Xenon tube rubber members 21a are provided at both ends of the xenon tube 21. The xenon tube rubber members 21a serve as insulate terminal portions of the xenon tube 21 and has a function of urging the xenon tube 21 toward the light reflector 22.

The light reflector 22 condenses the light emitted from the xenon tube 21. The prism panel 23 is equipped with an incidence surface and an emission surface so that the light from the xenon tube 21 and the light reflector 22 may be applied in a desired shooting range. The base member 24 has a space allowing incorporation of light-emission-related components such as the xenon tube 21, the light reflector 22, and the prism panel 23 described above. On a lower side of the base member 24, there is integrally formed a rack gear 24a that meshes with a fifth gear described below. The cover member 25 has a peaked portion 25a whose upper surface constitutes a part of the exterior of the camera 100.

In assembling the light emitting unit 20, the light-emission-related components described above are incorporated into the base member 24, and the cover member 25 is fitted with the base member 24 from above. Then, the base member 24 and the cover member 25 are fixed in position with using a catching portion (not illustrated) and a screw 26, so that the light emitting unit 20 can be assembled as an integral unit. The light emitting unit 20 is caused to slide in the vertical direction by a driving unit 30 described below, and can move to the light emitting position and the accommodated position.

Further, the flashlight emitting device 14 is equipped with an outer cover 31.

The outer cover 31 can be attached to an interior of the exterior member 11 of the camera 100, and serves as a holding portion for holding the light emitting unit 20 so as to allow it to slide in the vertical direction. Under the outer cover 31, there is formed a capacitor holding portion 31a for holding a capacitor 41 which supplies electrical power to the xenon tube 21 or the like. Further, on a side of the outer cover 31, there is formed an opening 31b which is situated in close proximity to the lead wires arranged from the light emitting unit 20 to the flexible wiring board 45 and allows access to the lead wires sidewise. When the outer cover 31 is incorporated into the exterior member 11, the opening 31b is surrounded by the exterior member 11 and is closed to the exterior.

Figure 3:
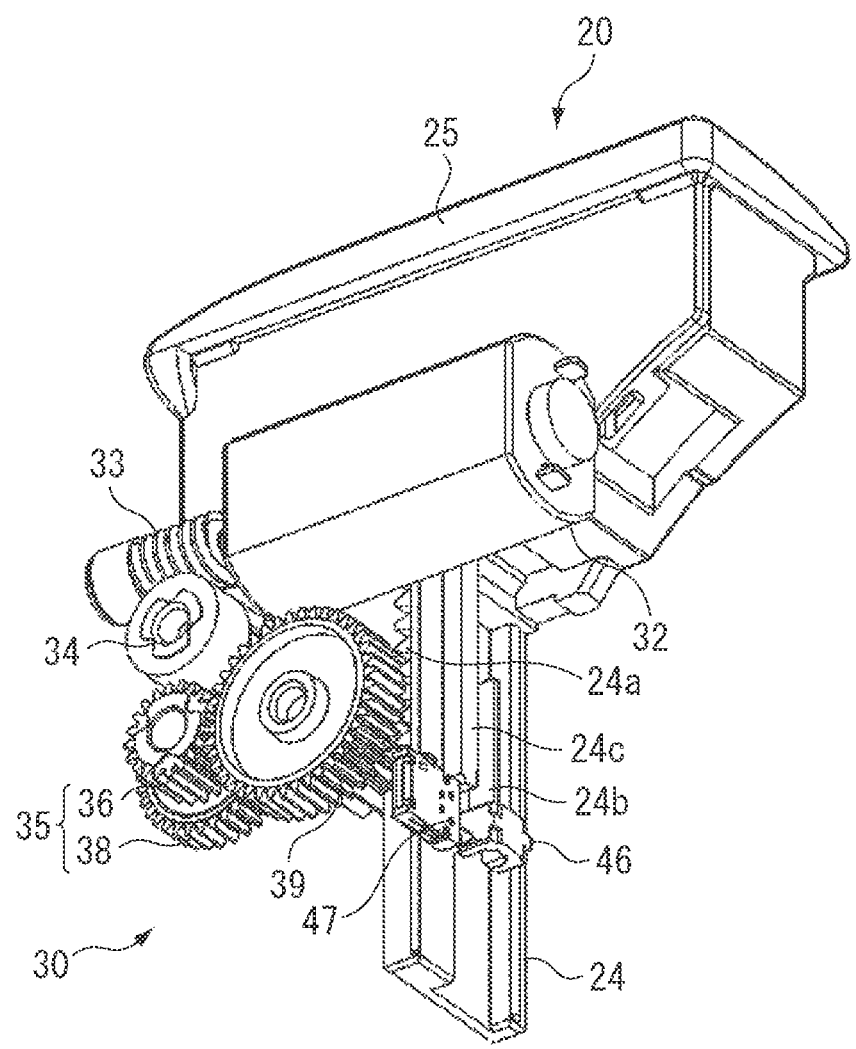
FIG. 3 is a perspective view of a part of the flash light emitting device of the exemplary embodiment.

The flashlight emitting device 14 is equipped with the driving unit 30. Here, the driving unit 30 of the flashlight emitting device 14 will be described with reference to FIGS. 2 and 3. FIG. 3 is a perspective view as seen from a rear side and from below, illustrating a positional relationship between the light emitting unit 20 and a part of the driving unit 30. The driving unit 30 includes a motor 32, a first gear 33, a second gear 34, a clutched gear 35, a fifth gear 39, a gear holder 40, and the like.

The motor 32 is a drive source for vertically driving the light emitting unit 20, and includes, for example, of a direct current (DC) motor. The motor 32 is fixed to the rear of the outer cover 31 via screws 42 such that its output shaft is arranged horizontally. Through electricity supply to terminal portions of the motor 32, the output shaft of the motor 32 makes normal rotation or reverse rotation.

Next, the first gear 31, the second gear 34, the clutched gear 35, and the fifth gear 39 which constitute a transmission mechanism will be described.

First, the first gear 33 is a worm gear. The first gear 33, into which the output shaft of the motor 32 is forced, rotates in synchronism with the output shaft of the motor 32. The second gear 34 is a two-stage gear. The gear forming one stage of the second gear 34 constitutes a worm wheel which meshes with the first gear 33.

The clutched gear 35 includes a third gear 36, a clutch spring 37, and a fourth gear 38. The third gear 36 meshes with the second gear 34 described above. The fourth gear 38 meshes with the fifth gear 39.

Figure 4A:
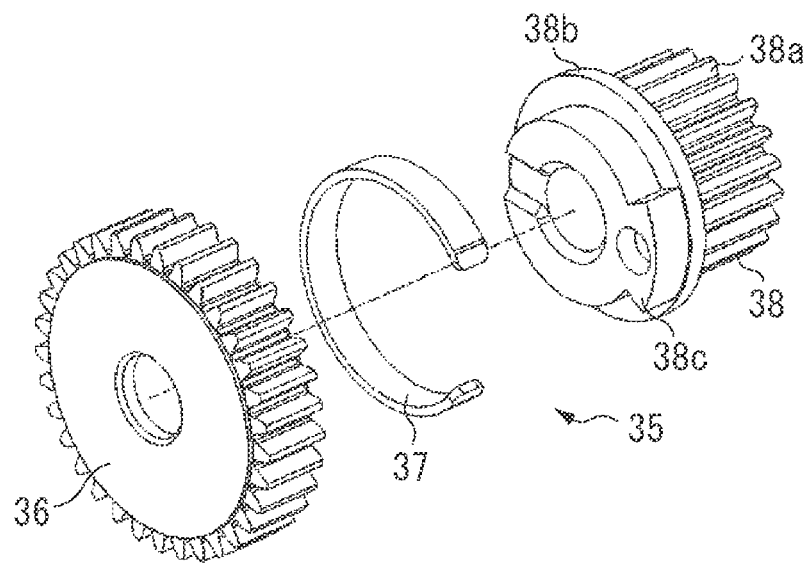
FIGS. 4A and 4B are exploded perspective views illustrating construction of a clutched gear according to the exemplary embodiment.
Figure 4B:
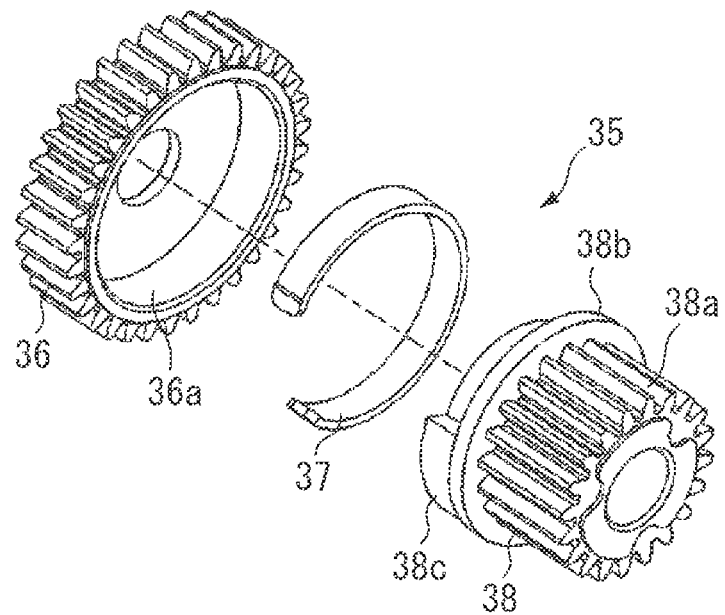

Here, construction of the clutched gear 35 will be described in detail with reference to FIGS. 4A and 4B. FIG. 4A is a perspective view, as seen from one side and from above, of components of the clutched gear 35. FIG. 4B is a perspective view, as seen from another side and from above, of the components of the clutched gear 35.

The third gear 36 is a spur gear within which a space 36a is formed. The clutch spring 37 is of a C-shaped spring which is obtained by rounding a strip-like cut thin plate into a ring. When the clutched gear 35 is assembled, the clutch spring 37 is accommodated in the third gear 36. Here, the clutch spring 37 is formed somewhat larger than the rounded space 36a in the third gear 36. Thus, when it is assembled, the clutch spring 37 is deformed so as to diminish a cutout portion of its C-shaped configuration, and is forced into the third gear 36 to be accommodated therein.

A spur gear 38a is formed on one side of the fourth gear 38. On the other side of the fourth gear 38, there are formed a flange 38b fitted with the third gear 36 and a projection portion 38c fitted with the cutout portion of the C-shaped clutch spring 37. The spur gear 38a, the flange 38b, and the projection portion 38c of the fourth gear 38 are formed integrally.

When a torque applied to the clutched gear 35 is smaller than a predetermined level, the clutched gear 35 rotates between the third gear 36 and the fourth gear 38 in synchronism therewith. On the other hand, when a torque of not less than the predetermined level is applied, the third gear 36 and the clutch spring 37 start to slip, and, even if the third gear 36 rotates, the fourth gear 38 idles, so that the rotation of the third gear 36 is not transmitted. The settings of the C-shaped configuration, a thickness, and a material of the clutch spring 37 are controlled, and, by changing the settings of the above factors, it is possible to change the torque that causes the third gear 36 and the clutch spring 37 to start to slip.

Referring back to FIGS. 2 and 3, the fifth gear 39 is a stepped gear. The fifth gear 39 meshes with the rack gear 24a of the above described base member 24.

The gear holder 40 rotatably supports the first gear 33, the second gear 34, the clutched gear 35, and the fifth gear 39 between itself and the outer cover 31. The gear holder 40 is fixed in position by a screw from the rear side of the outer cover 31.

Further, the flashlight emitting device 14 is equipped with a toggle spring 43. Both end portions of the toggle spring 43 are formed in a hole-like configuration. One end portion is locked to a lock portion 31c of the outer cover 31 so as to be caught thereby, and the other end portion is locked to the base member 24 of the light emitting unit 20 via a screw 44. The toggle spring 43 is formed so as to be rotatable via the lock portion 31c of the outer cover 31 and the screw 44 of the base member 24.

Using a midpoint of a course of vertical sliding of the light emitting unit 20 as a boundary, the toggle spring 43 urges the light emitting unit 20 toward the light emitting position, i.e. a top dead center side, or toward the accommodated position, i.e. a bottom dead center side. Thus, the light emitting unit 20 does not stop halfway through either on the top dead center side or the bottom dead center side. Further, there is no possibility for the light emitting unit 20 to be raised by vibration. The toggle spring 43 also has a function of absorbing play due to a backlash of the above described gears 33, 34, 35, and 39.

Figure 5:
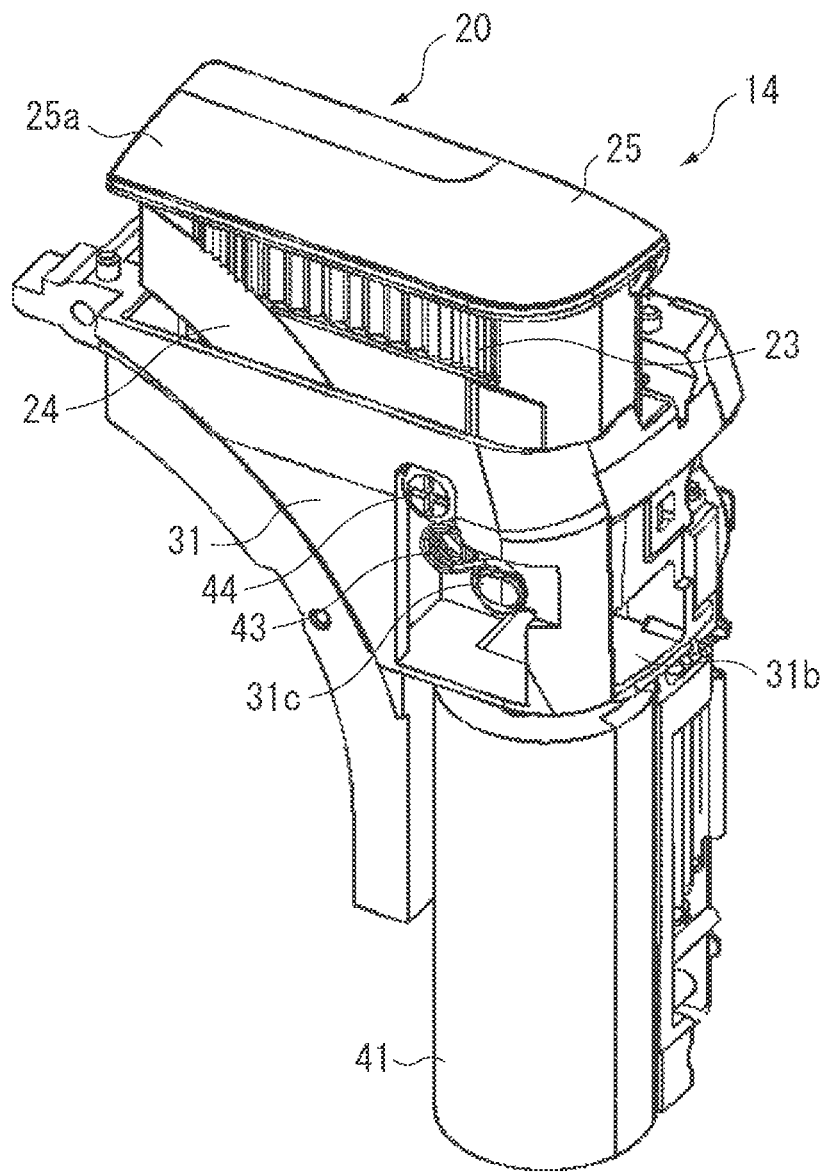
FIG. 5 is a perspective view of the flashlight emitting device of the exemplary embodiment.

Referring to FIG. 5, a case in which the light emitting unit 20 has risen with respect to the outer cover 31 will be described. FIG. 5 is a perspective view, as seen from the front side and from above, of the flashlight emitting device 14. As illustrated in FIG. 5, the screw 44 by means of which the toggle spring 43 is locked to the base member 24 abuts the outer cover 31 when the light emitting unit 20 moves upwards with respect to the outer cover 31. In other words, the screw 44 functions as a stopper for regulating an upper limit to the ascent of the light emitting unit 20.

Referring back to FIG. 2, the flashlight emitting device 14 is equipped with the flexible wiring board 45. Connection terminals and lead wires of the motor 32 are connected to the flexible wiring board 45 by soldering. The flexible wiring board 45 is equipped with a light emission circuit for causing the xenon tube 21 to emit light, and a connector for connection to a central processing unit (CPU). The flexible wiring board 45 is fixed to the outer cover 31 from behind the gear holder 40.

Two position detection switches serving as position detection units are mounted to the flexible wiring board 45 by soldering. One position detection switch is a photo interrupter 46 serving as a first position detection unit, and the other position detection switch is a pop-up position detection switch 47 serving as a second position detection unit.

Referring to FIG. 3, arrangement positions of the photo interrupter 46 and the pop-up position detection switch 47 with respect to the light emitting unit 20 in a state that the flexible wiring board 45 is fixed to the outer cover 31 will be described. In FIG. 3, the flexible wiring board 45 is omitted, and only the photo interrupter 46 and the pop-up position detection switch 47 are illustrated. As illustrated in FIG. 3, the photo interrupter 46 and the pop-up position detection switch 47 are arranged so as to be situated on the back side of the rack gear 24a formed on the base member 24.

First, when the light emitting unit 20 slides in the vertical direction, due to a rib 24b formed on the base member 24 of the light emitting unit 20, the photo interrupter 46 either receives or does not receive light from a light projecting portion, so that a signal is electrically switched. More specifically, the photo interrupter 46 either receives or does not receive the light from the light projecting portion, so that it outputs a light-to-dark signal or a dark-to-light signal.

In the present exemplary embodiment, during the movement of the light emitting unit 20 from the accommodated position to the light emitting position, the photo interrupter 46 outputs the light-to-dark signal and the dark-to-light signal. Similarly, during the movement of the light emitting unit 20 from the light emitting position to the accommodated position, the photo interrupter 46 outputs the light-to-dark signal and the dark-to-light signal.

Thus, processing in which the photo interrupter 46 outputs the light-to-dark signal corresponds to an example of an operation of a first detection unit detecting that the light emitting unit 20 has passed a first position. Further, processing in which the photo interrupter 46 outputs the dark-to-light signal corresponds to an example of an operation of a second detection unit detecting that the light emitting unit 20 has passed a second position.

When the light emitting unit 20 slides in the vertical direction, the pop-up position detection switch 47 abuts a rib 24c formed on the base member 24 of the light emitting unit 20, so that ON and OFF of a signal is electrically switched. Thus, processing in which the pop-up position detection switch 47 outputs a signal corresponding to a change of ON and OFF corresponds to an example of an operation of a third detection unit detecting that the light emitting unit 20 has passed a third position.

The rib 24b for the photo interrupter 46 and the rib 24c for the pop-up position detection switch 47 are formed at different positions. More specifically, it is configured such that when the light emitting unit 20 slides in the vertical direction, switching timing of ON and OFF of the pop-up position detection switch 47 is present during a period in which the photo interrupter 46 outputs a light/dark signal twice while changing the signal from one type to the other.

The switching timing of the pop-up position detection switch 47 can be present between two times of switching of the photo interrupter 46. In other words, for example, the photo interrupter 46 and the pop-up position detection switch 47 may be arranged on mounting positions that are deviated from each other in the sliding direction of the light emitting unit 20.

Referring back to FIG. 2, the flashlight emitting device 14 is equipped with a flexible wiring board holder 48 and an insulating sheet 49. The flexible wiring board holder 48 prevents the flexible wiring board 45 on the gear holder 40 from being raised. The insulating sheet 49 is attached so as to cover a main portion of the flexible wiring board 45.

Figure 6:
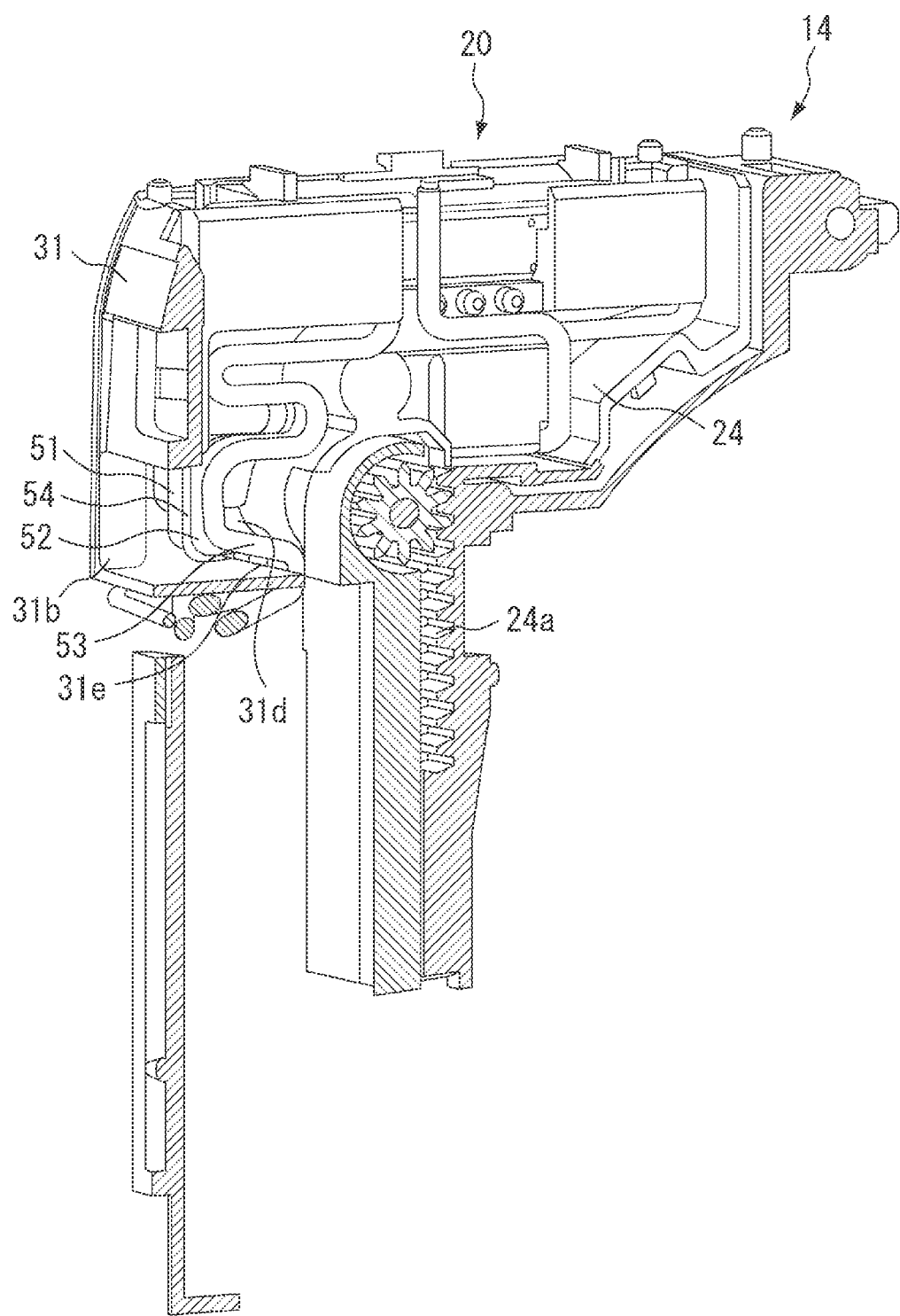
FIG. 6 is a perspective view, partially in section, of the flashlight emitting device of the exemplary embodiment.
Figure 7:
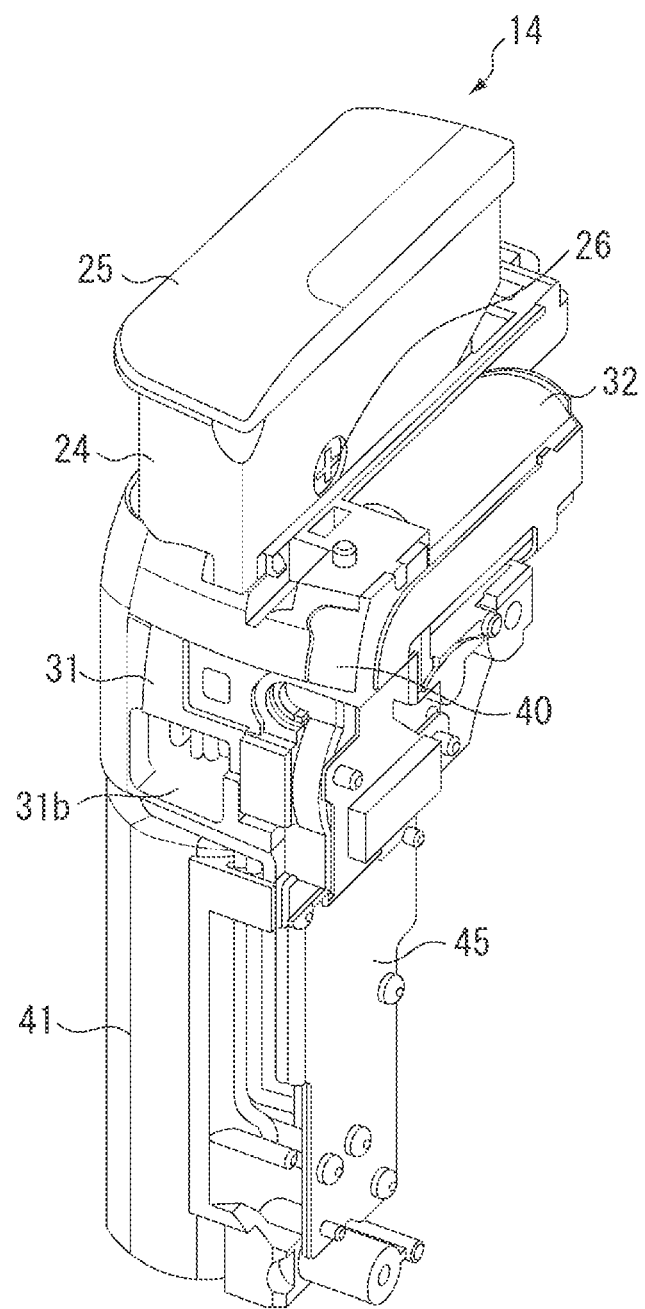
FIG. 7 is a perspective view of the flashlight emitting device of the exemplary embodiment.

Next, the flashlight emitting device 14 in an assembled state will be described with reference to FIGS. 6 and 7. FIG. 6 is a partially cutaway cross sectional view of the flashlight emitting device 14 as seen from the rear side. FIG. 7 is a perspective view of the flashlight emitting device 14 as seen from the rear side and from above.

As illustrated in FIG. 6, a plurality of lead wires 51, 52, 53, and 54 are led to the flexible wiring board 45 from the light emitting unit 20. The lead wires 51, 52, 53, and 54 are bent within the space (accommodation space portion 31d) in the outer cover 31 to the light emitting unit 20 extending between the outer cover 31 and the base member 24. Then, they are passed through a connection hole 31e open in the outer cover 31 and connected to the flexible wiring board 45. FIG. 7 shows how the lead wires, after being passed through the connection hole 31e, are led to the flexible wiring board 45 on a lower side portion of the outer cover 31. The reason for bending the lead wires 51, 52, 53, and 54 within the accommodation space portion 31d is to enable the lead wires 51, 52, 53, and 54 to extend when the light emitting unit 20 rises to the light emitting position.

Immediately after the assembly of the flashlight emitting device 14, the lead wires 51, 52, 53, and 54 are not aligned within the accommodation space portion 31d as illustrated in FIG. 6. When they are not aligned, the lead wires 51, 52, 53, and 54 constitute a load when the light emitting unit 20 ascends or descends, and the lead wires may be broken in some cases.

Thus, after the flashlight emitting device 14 is assembled, an assembly worker or an automatic assembly apparatus inserts a tool into the accommodation space portion 31d communicating with the opening 31b via the opening 31b of the outer cover 31. And, the lead wires 51, 52, 53, and 54 are put into shape by being simultaneously twisted in the same direction. More specifically, the assembly worker collectively holds the lead wires 51, 52, 53, and 54 by tweezers via the opening 31b, and twists them in the same direction. Accordingly, it is desirable for the opening 31b to be large enough to allow insertion of a tool capable of collectively holding a plurality of lead wires.

By putting the lead wires 51, 52, 53, and 54 into the shape, the lead wires 51, 52, 53, and 54 are aligned in the accommodation space portion 31d, and are enabled to be accommodated as designed. By thus putting the lead wires 51, 52, 53, and 54 into the shape, even when the light emitting unit 20 descends after ascending, the lead wires 51, 52, 53, and 54 are restored to the state in which they are put into shape within the accommodation space portion 31d. Thus, when the light emitting unit 20 ascends or descends, the load due to the lead wires 51, 52, 53, and 54 can be reduced. In putting the lead wires 51, 52, 53, and 54 into the shape, it is desirable, from the viewpoint of workability, to hold them by a tool such as tweezers after the assembly of the flashlight emitting device 14.

When the flashlight emitting device 14 is assembled, the flashlight emitting device 14 is an integral unit including the light emitting unit 20, the driving unit 30, the light emission circuit, and the like, so that processing, visual inspection, and operational checking of the lead wires can be easily performed.

Next, an operation of the flashlight emitting device 14 will be described more specifically with reference to FIGS. 8A, 8B, and 9.

Figure 8A:
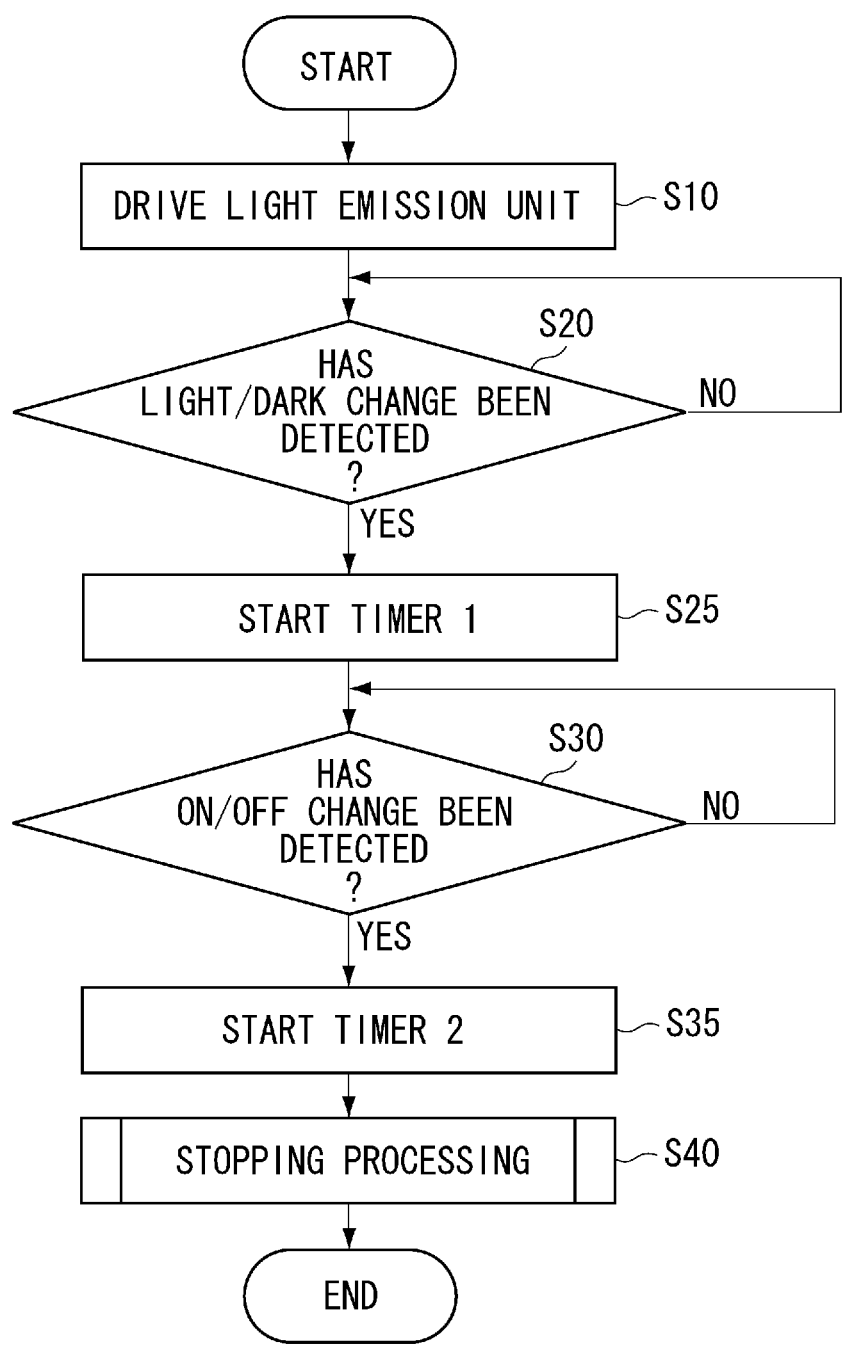
Figure 9:
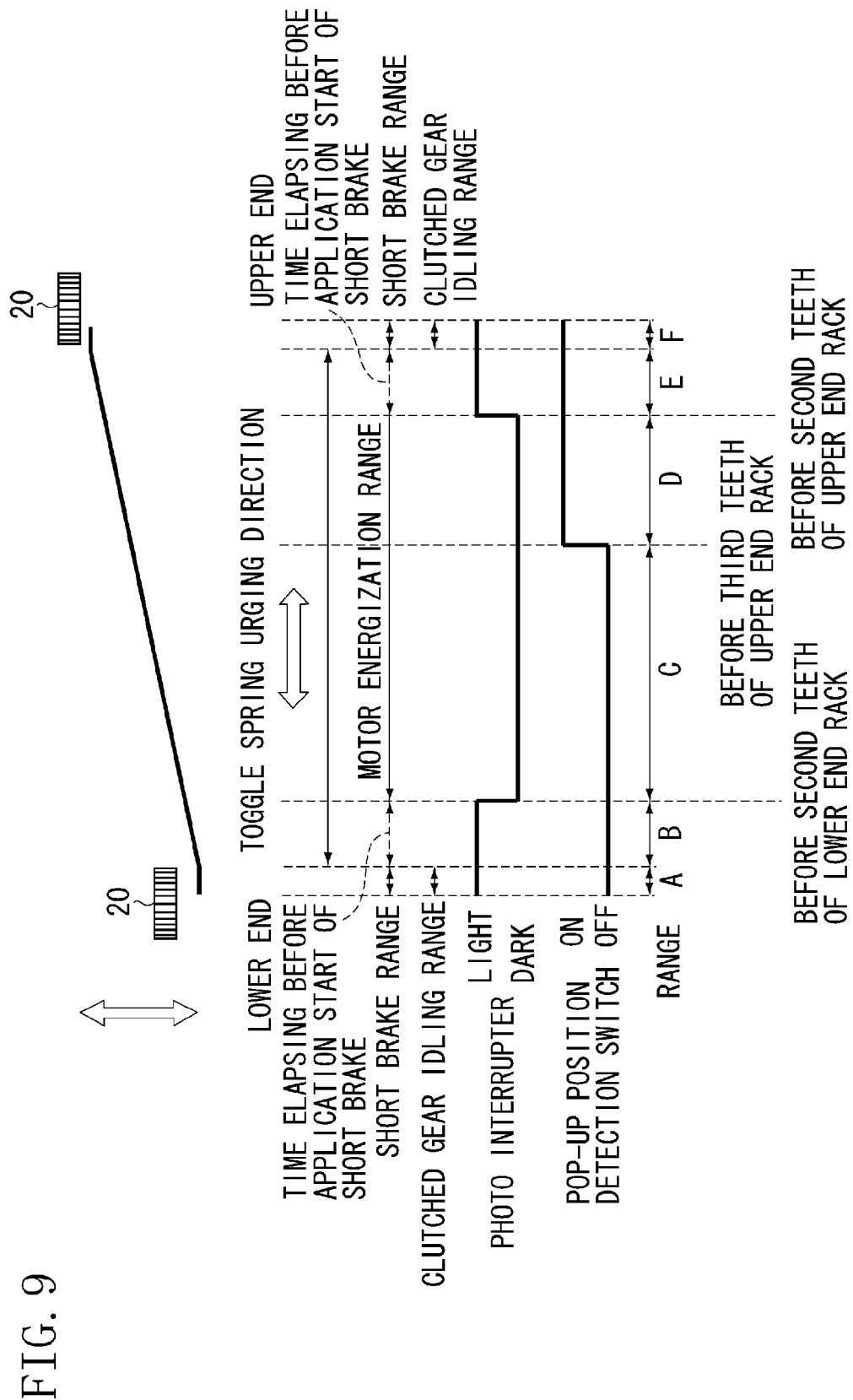
FIG. 9 is a timing chart illustrating an operation of the flashlight emitting device of the exemplary embodiment.

FIGS. 8A and 8B are flowcharts illustrating operational processing of the flashlight emitting device 14 (camera). Procedures of the flowcharts in FIGS. 8A and 8B are realized by a CPU which controls an entire operation of the camera 100 executing programs stored in a memory or the like. FIG. 9 is a timing chart illustrating timing with which the light emitting unit 20 ascends or descends. FIG. 9 shows that the photo interrupter 46 and the pop-up position detection switch 47 are arranged so as to be deviated from each other by several teeth of the rack gear 24a formed on the base member 24.

First, a case in which the light emitting unit 20 at the accommodated position is raised (popped up) to the light emitting position will be described.

In step S10, the CPU starts electricity supply to rotate the motor 32 so as to cause the light emitting unit 20 to ascend from the accommodated position to the light emitting position automatically or in response to an operation by a user. At this time, in the driving unit 30, the first gear 33 through the fifth gear 39 simultaneously start to rotate in synchronization with the rotation of the motor 32.

Here, the clutch spring 37 of the clutched gear 35 outwardly pushes against the inner peripheral surface of the third gear 36, so that the clutch spring 37 rotates integrally with the third gear 36. The fourth gear 38 of the clutched gear 35 is fitted with the cutout portion of the clutch spring 37 by the projection portion 38c, so that the fourth gear 38 rotates integrally with the clutch spring 37. In other words, the third gear 36 and the fourth gear 38 rotate integrally. The rotation of the clutch gear 35 is transmitted to the fifth gear 39, and the light emitting unit 20 is raised via the rack gear 24a.

In step S20, the CPU determines whether the photo interrupter 46 has detected a light-to-dark change as a result of the ascent of the light emitting unit 20. The CPU waits for detection of the change and when the change is detected (YES in step S20), the procedure advances to step S25. In step S25, a timer 1 starts time measurement, and the procedure advances to step S30.

In step S30, the CPU continues the electricity supply to the motor 32 so as to raise the light emitting unit 20 as it is. Subsequently, the CPU determines whether the pop-up position detection switch 47 has detected an OFF-to-ON change. The CPU waits for detection of the change and when the change is detected (YES in step S30), the procedure advances to step S35.

In step S35, a timer 2 starts time measurement, and the procedure advances to step S40.

In step S40, the CPU performs stop processing in which a short brake is applied for a fixed period of time to stop the motor 32. Here, the short brake is a brake which effects braking through short-circuiting of the terminals of the motor 32. In the final stage of application of the short brake, a head portion of the screw 44 fixed to the base member 24 of the ascending light emitting unit 20 abuts the outer cover 31, so that the ascent of the light emitting unit 20 is regulated.

At this time, the output shaft of the motor 32 rotates for a while, however, the clutch spring 37 of the clutched gear 35 starts to slip on the inner peripheral surface of the third gear 36. Thus, no rotation is transmitted to the fourth gear 38, so that shock at the time of stopping is not transmitted to each gear.

The light emitting unit 20 moves to the light emitting position, and then emits light after the vibration of the motor 32, the gears, and the toggle spring 43 has been attenuated. In this way, light emission is effected after the application of the short brake, accordingly it is possible to obtain a uniform image of stable angle of view.

As in the present exemplary embodiment, in a type of construction in which the light emitting unit 20 ascends and descends in the vertical direction of the camera 100, the lead wires 51, 52, 53, and 54 are bent or extended as the light emitting unit 20 ascends or descends. When the ambient temperature is low, the lead wires 51, 52, 53, and 54 are hard, so that the load at the time of their bending or extending is large, and the movement load of the light emitting unit 20 is also large.

Thus, when the motor 32 is driven under a fixed voltage, the movement of the light emitting unit 20 is retarded. Conversely, when the ambient temperature is high, the lead wires 51, 52, 53, and 54 are soft, so that the movement load of the light emitting unit 20 is small. Accordingly, when the motor 32 is driven under the fixed voltage, the movement of the light emitting unit 20 is accelerated.

In view of this, in the present exemplary embodiment, a time period that elapses since the dark-to-light change of the photo interrupter 46 until a start of application of the short brake is set based on the movement time of the light emitting unit 20. Further, the voltage of the motor 32 since the dark-to-light change of the photo interrupter 46 until the start of application of the short brake is set based on the movement time of the light emitting unit 20. Here, the operational processing in step S40 will be described in detail with reference to the flowchart in FIG. 8B.

In step S50, the CPU determines whether the photo interrupter 46 has detected a dark-to-light change as a result of the ascent of the light emitting unit 20. The CPU waits for detection of the change and when the change is detected (YES in step S50), the procedure advances to step S55.

In step S55, the CPU terminates the time measurement by the timer 1 started in step S25 and the time measurement by the timer 2 started in step S35.

Thus, the timer 1 measures the time that elapses since the detection of the light-to-dark change by the photo interrupter 46 in step S20 until the detection of the dark-to-light change by the photo interrupter 46 in step S50. This processing corresponds to an example of processing by a first measurement unit. This time corresponds to time C+D illustrated in the timing chart in FIG. 9.

The timer 2 measures the time that elapses since the ON detection by the pop-up position detection switch 47 in step S30 until the detection of a dark-to-light change by the photo interrupter 46 in step S50. This processing corresponds to an example of processing by a second measurement unit. This period of time corresponds to time D in the timing chart in FIG. 9.

In step S60, the CPU sets the period of time that elapses since the dark-to-light change of the photo interrupter 46 in step S50 until the application of the short brake is started according to the time measured by the timer 1 and based on a correspondence table or the like stored in the memory in advance. This processing corresponds to an example of processing performed by a setting unit. The period of time that elapses until the application of the short brake is started corresponds to time E in the timing chart in FIG. 9.

It is assumed that, for example, the time measured by the timer 1 is longer than previously set first reference time at the time of ascent. In this case, the movement speed of the light emitting unit 20 is low, so that the period of time that elapses since the dark-to-light change of the photo interrupter 46 until the application of the short brake is started is set to be longer than the predetermined period of time at the time of ascent.

Here, the first reference time at the time of ascent is the period of time that elapses since the light-to-dark change detection until the dark-to-light change detection by the photo interrupter 46 in a state in which the ambient temperature is not low (e.g., when the temperature is 25° C. and the humidity is 50%). The first reference time at the time of ascent is previously stored in the CPU.

Further, the predetermined period of time at the time of ascent is also the time that elapses since the dark-to-light change of the photo interrupter 46 until the application of the short brake is started in a state in which the ambient temperature is not low (e.g., when the temperature is 25° C. and the humidity is 50%). This value is also previously stored in the CPU.

In the present exemplary embodiment, the CPU not only delays the application of the short brake, but also applies large voltage to the motor 32 as described below to thereby increase the movement speed of the light emitting unit 20, in order to match the period of time that elapses until the ascent with a normal period of time.

In step S70, the CPU sets the voltage applied to the motor 32 (an amount of electricity supplied to the motor) since the dark-to-light change of the photo interrupter 46 in step S50 until the period of time calculated in step S60 has elapsed. This processing corresponds to an example of the processing performed by the setting unit. At this time, the CPU sets the voltage applied to the motor 32 according to the time measured by the timer 2 and based on a correspondence table or the like previously stored in the memory.

It is assumed that, for example, the time measured by the timer 2 is longer than previously set second reference time at the time of ascent. In this case, the movement speed of the light emitting unit 20 is low, so that, to increase the movement speed of the light emitting unit 20, the voltage applied to the motor 32 is set to be larger than the voltage that has been applied to the motor 32 during the period of time in which the photo interrupter 46 changes from dark to light.

The second reference time at the time of ascent is the period of time that elapses since the OFF-to-ON change of the pop-up position detection switch 47 until the detection of the dark-to-light change by the photo interrupter 46 in a state in which the ambient temperature is not low (e.g., when the temperature is 25° C. and the humidity is 50%). The second reference time at the time of ascent is previously stored in the CPU.

By measuring the immediately preceding movement time (time D) with using the photo interrupter 46 and the pop-up position detection switch 47, the CPU can set an optimum voltage to be applied to the motor 32. In step S80, the CPU controls the driving of the motor 32 based on the time and voltage set in step S60 and step S70.

Next, a case in which the light emitting unit 20 at the light emitting position is lowered (popped down) to the accommodated position will be described.

In step S10, the CPU starts electricity supply to rotate the motor 32 so as to lower the lighting unit 20 from the light emitting position to the accommodated position automatically or in response to an operation by the user. At this time, in the driving unit 30, the first gear 33 through the fifth gear 39 simultaneously start to rotate in synchronization with the rotation of the motor 32.

Here, the clutch spring 37 of the clutched gear 35 outwardly pushes against the inner peripheral surface of the third gear 36, so that the clutch spring 37 rotates integrally with the third gear 36. The fourth gear 38 of the clutched gear 35 is fitted with the cutout portion of the clutch spring 37 by the projection portion 38c, so that the fourth gear 38 rotates integrally with the clutch spring 37. In other words, the third gear 36 and the fourth gear 38 rotate integrally. The rotation of the clutched gear 35 is transmitted to the fifth gear 39, and the light emitting unit 20 descends via the rack gear 24a.

In step S20, the CPU determines whether the photo interrupter 46 has detected a light-to-dark change as a result of the descent of the light emitting unit 20. The CPU waits for detection of the change and when the change is detected (YES in step S20), the procedure advances to step S25.

In step S25, the timer 1 starts time measurement, and the procedure advances to step S30.

In step S30, the CPU continues electricity supply to the motor 32 so as to lower the light emitting unit 20 as it is. Subsequently, the CPU determines whether the pop-up position detection switch 47 has detected an ON-to-OFF change. The CPU waits for detection of the change and when the change is detected (YES in step S30), the procedure advances to step S35.

In step S35, the timer 2 starts time measurement, and the procedure advances to step S40.

In step S40, the CPU performs stop processing in which a short brake is applied for the fixed period of time to stop the motor 32. In the final stage of application of the short brake, the peaked portion 25a of the cover member 25 of the descending light emitting unit 20 abuts the outer cover 31, so that the descent of the light emitting unit 20 is regulated. At this time, the output shaft of the motor 32 rotates for a while, however, the clutch spring 37 of the clutched gear 35 starts to slip on the inner peripheral surface of the third gear 36. Thus, no rotation is transmitted to the fourth gear 38, so that shock at the time of stopping is not transmitted to each gear.

As in the case of the ascent of the light emitting unit 20, in the present exemplary embodiment, also in the case of the descent of the light emitting unit 20, the time that elapses since the dark-to-light change of the photo interrupter 46 until the application of the short brake is started is set based on the movement time of the light emitting unit 20. Further, the voltage of the motor 32 since the dark-to-light change of the photo interrupter 46 until the start of application of the short brake is set based on the movement time of the light emitting unit 20.

In step S50, the CPU determines whether the photo interrupter 46 has detected the dark-to-light change as a result of the descent of the light emitting unit 20. The CPU waits for detection of the change and when the change is detected (YES in step S50), the procedure advances to step S55.

In step S55, the CPU terminates the time measurement by the timer 1 started in step S25 and the time measurement by the timer 2 started in step S35.

Thus, the timer 1 measures the time that elapses since the detection of the light-to-dark change by the photo interrupter 46 in step S20 until the detection of the dark-to-light change by the photo interrupter 46 in step S50. This processing corresponds to an example of the processing by the first measurement unit. This time corresponds to the time C+D illustrated in the timing chart in FIG. 9.

The timer 2 measures the time that elapses since the OFF detection by the pop-up position detection switch 47 in step S30 until the detection of a dark-to-light change by the photo interrupter 46 in step S50. This processing corresponds to an example of the processing by the second measurement unit. This time corresponds to the time C illustrated in the timing chart in FIG. 9.

In step S60, the CPU sets the period of time that elapses since the dark-to-light change of the photo interrupter 46 in step S50 until the application of the short brake is started according to the time measured by the timer 1 and based on the correspondence table or the like stored in the memory in advance. This processing corresponds to an example of the processing performed by the setting unit. The period of time that elapses until the application of the short brake is started corresponds to time B in the timing chart in FIG. 9.

It is assumed that, for example, the time measured by the timer 1 is longer than previously set first reference time at the time of descent. In this case, the movement speed of the light emitting unit 20 is low, so that the period of time that elapses since the dark-to-light change of the photo interrupter 46 until the application of the short brake is started is set to be longer than the predetermined period of time at the time of descent.

Here, the first reference time at the time of descent is the period of time that elapses since the detection of the light-to-dark change until the detection of the dark-to-light change by the photo interrupter 46 in a state in which the ambient temperature is not low (e.g., when the temperature is 25° C. and the humidity is 50%). The first reference time at the time of descent is previously stored in the CPU.

Further, the predetermined period of time at the time of descent is the period of time that elapses since the dark-to-light change of the photo interrupter 46 until the application of the short brake is started in a state in which the ambient temperature is not low (e.g., when the temperature is 25° C. and the humidity is 50%). This value is also previously stored in the CPU.

In step S70, the CPU sets the voltage applied to the motor 32 (an amount of electricity supplied to the motor) since the dark-to-light change of the photo interrupter 46 in step S50 until the period of time calculated in step S60 has elapsed. This processing corresponds to an example of the processing performed by the setting unit. At this time, the CPU sets the voltage applied to the motor 32 according to the time measured by the timer 2 and based on a correspondence table or the like previously stored in the memory.

It is assumed that, for example, the time measured by the timer 2 is longer than previously set second reference time at the time of descent. In this case, the movement speed of the light emitting unit 20 is low, so that, to increase the movement speed of the light emitting unit 20, the voltage applied to the motor 32 is set to be larger than the voltage that has been applied to the motor 32 during the period of time in which the photo interrupter 46 changes from dark to light.

The second reference time at the time of descent is the period of time that elapses since the ON-to-OFF change of the pop-up position detection switch 47 until the detection of the dark-to-light change by the photo interrupter 46 in a state in which the ambient temperature is not low (e.g., when the temperature is 25° C. and the humidity is 50%). The second reference time at the time of descent is previously stored in the CPU.

In step S80, the CPU controls the driving of the motor 32 based on the time and voltage set in step S60 and step S70.

In this way, according to the present exemplary embodiment, even if the ambient temperature and humidity of the environment in which the camera is used change, the driving voltage and the driving time of the motor 32 are changed according to variation in the load of the light emitting unit 20 at the time of ascent and at the time of descent thereof. Here, the driving voltage of the motor 32 is the voltage during the ascent time E and the voltage during the descent time B illustrated in the timing chart in FIG. 9. The driving time is the ascent time E and the descent time B illustrated in the timing chart in FIG. 9.

Thus, even if no temperature sensor is provided, by controlling the driving immediately before the completion of the ascent and descent movement of the light emitting unit 20, it is possible to stabilize the movement, and to perform the ascent movement and the descent movement in a fixed period of time.

The present invention is not restricted to the above-described exemplary embodiment but allows various variations and modifications without departing from the scope of the gist thereof. For example, while in the above described exemplary embodiment, the driving voltage of the motor 32 immediately before the application of the short brake is changed for the sake of convenience, the exemplary embodiment of the present invention is not substantially changed if a pulse width is changed with using the well-known pulse-width modulation (PWM) control.

Further, while only the case in which the light emitting unit 20 moves vertically has been described, it is also possible for the light emitting unit 20 to be moved horizontally or in a rotating direction.

Further, the present invention can be applied to a case in which the light emitting unit 20 constitute a movable unit, and the flashlight emitting device 14 or the camera 100 may constitute a movable unit driving apparatus. While in the above described exemplary embodiment, the flashlight emitting device 14 is provided within the camera 100, and the light emitting unit 20 is movable within the flashlight emitting device 14, the present invention is not limited to this configuration and is also applicable to a movable unit driving apparatus capable of driving some other movable unit. Further, a movable unit driving method for driving a movable unit is also applicable as described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-189519 filed Aug. 18, 2009, which is hereby incorporated by reference herein in its entirety.

What is claimed is:

1. A movable unit driving apparatus which drives a movable unit by a motor, the movable unit driving apparatus comprising:
   a first detection unit configured to detect that the movable unit passes a first position;
   a second detection unit configured to detect that the movable unit passes a second position after the first detection unit detects that the movable unit has passed the first position;
   a third detection unit configured to detect that the movable unit passes a third position after the first detection unit detects that the movable unit has passed the first position and before the second detection unit detects the movable unit passes the second position;
   a first measurement unit configured to measure first time from when the first detection unit detects that the movable unit passes the first position to when the second detection unit detects that the movable unit passes the second position;
   a second measurement unit configured to measure second time from when the third detection unit detects that the movable unit passes the third position to when the second detection unit detects that the movable unit passes the second position; and
   a setting unit configured to set time from when the movable unit is detected to have passed the second position to when a brake is applied to the motor based on the first time measured, and set an amount of electricity to be supplied to the motor from when the movable unit is detected to have passed the second position to when the brake is applied to the motor based on the second time.

2. The movable unit driving apparatus according to claim 1, wherein when the time measured by the first measurement unit is longer than first reference time, the setting unit sets the time from when the movable unit is detected to have passed the second position to when the brake is applied to the motor longer than predetermined time.

3. The movable unit driving apparatus according to claim 1, wherein when the time measured by the second measurement unit is longer than second reference time, the setting unit sets the amount of electricity to be supplied to the motor from when the movable unit is detected to have passed the second position to when the brake is applied to the motor larger than a predetermined electricity supply amount.

4. The movable unit driving apparatus according to claim 1, wherein
   the movable unit is a light emitting unit which moves between an accommodated position and a light emitting position with respect to a camera main body, and
   the light emitting unit is electrically connected to a circuit board arranged inside the camera main body via a lead wire.

* * * * *